United States Patent [19]

Yoneyama

[11] 3,742,395

[45] June 26, 1973

[54] VARIABLE BANDWIDTH APPARATUS FOR TRANSMISSION SYSTEM

[75] Inventor: Masahide Yoneyama, Kawasaki, Japan

[73] Assignee: Nippon Columbia Co., Ltd., Tokyo, Japan

[22] Filed: Oct. 15, 1971

[21] Appl. No.: 189,559

[30] Foreign Application Priority Data

Oct. 21, 1970 Japan ................................ 45/92644
Oct. 21, 1970 Japan ................................ 45/92645

[52] U.S. Cl. .............. 333/17, 178/DIG. 19, 325/65, 333/70 R

[51] Int. Cl. ................................................ H03h 7/12

[58] Field of Search ............................ 333/17, 70 R; 325/427, 65; 179/1 D, 1 P; 178/DIG. 19

[56] References Cited

UNITED STATES PATENTS

| | | | |
|---|---|---|---|
| 2,763,840 | 9/1956 | Pfleger | 333/17 |
| 2,580,052 | 12/1951 | Torre et al. | 333/17 X |
| 2,593,698 | 4/1952 | Riesz | 333/17 X |
| 3,079,571 | 2/1963 | Elliott et al. | 333/17 |
| 2,717,931 | 9/1955 | Duke | 178/DIG. 19 |

*Primary Examiner*—Paul L. Gensler
*Attorney*—Hill, Sherman, Meroni, Gross & Simpson

[57] ABSTRACT

A variable bandwidth apparatus for a signal transmission system having a circuit for changing the bandwidth in response to the spectrum of a signal to be transmitted.

4 Claims, 11 Drawing Figures

INVENTOR
Masahide Yoneyama

BY
Hill, Sherman, Meroni, Gross + Simpson
ATTORNEY

INVENTOR
Masahide Yoneyama

BY
Hill Sherman Meroni Gross & Simpson
ATTORNEY

Patented June 26, 1973 3,742,395

4 Sheets-Sheet 3

INVENTOR
Masahide Yoneyama

BY
Hill Sherman Meroni Gross & Simpson

ATTORNEY

INVENTOR
Masahide Yoneyama

BY
Hill Sherman Meroni Gross & Simpson
ATTORNEY

VARIABLE BANDWIDTH APPARATUS FOR TRANSMISSION SYSTEM

BACKGROUND OF THE INVENTION

1. Field of the Invention

This invention relates to a variable bandwidth apparatus for a transmission system of television signals or the like.

2. Description of the Prior Art

A conventional transmission system for television signals or the like has a defect such that since its pass band characteristic is constant irrespective of the frequency component of a signal being transmitted,its S/N ratio is lowered by a high-frequency noise when the frequency band of the signal is narrow. However, a filter of a wide pass band characteristic is also used for a signal of a relatively low frequency-spectrum characteristic, so that a noise at high frequencies increases to provide for increased redundancy of the transmission system.

SUMMARY OF THE INVENTION

Accordingly, the primary object of the present invention is to provide a variable bandwidth apparatus for a signal transmission system which is free from the defect experienced in the prior art.

Another object of this invention is to provide a variable bandwidth apparatus for a signal transmission system with which it is possible to change the bandwidth of the transmission system in accordance with the spectrum of a signal being transmitted.

Still another object of this invention is to provide a variable bandwidth apparatus for a signal transmission system with which it is possible to change automatically the bandwidth of the transmission system in accordance with the spectrum of a signal being transmitted.

Other objects, features and advantages of this invention will become apparent from the following description taken in conjunction with the accompanying drawings.

DESCRIPTION OF THE PREFERRED EMBODIMENTS

For a better understanding of this invention, a description will be given first of a signal transmission system.

In a television camera employing a camera tube such as a vidicon, plembicon or the like which utilizes the internal photoelectric effect, an output current of the camera tube is so weak that the output is usually amplified by a preamplifier up to the level of a video signal and the S/N ratio is determined by the preamplifier used.

Figure 1:
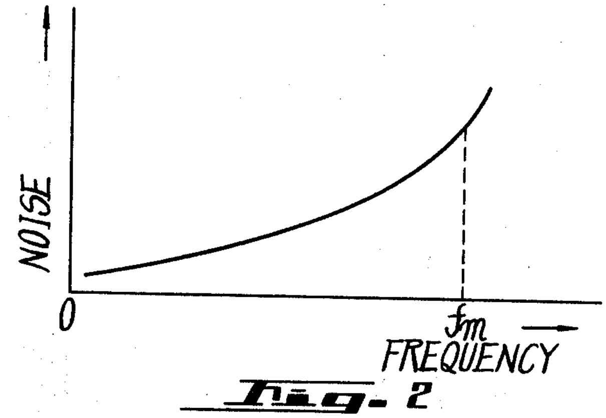
FIG. 1 is a graph showing the distribution of noise generated by a preamplifier of a vidicon or plumbicon camera.

The S/N ratio of the output current from the camera tube is very excellent but is affected by the output capacitance of the camera tube and the input capacitance of the preamplifier because of very low output level and very high output impedance of the camera tube, so that the frequency spectrum of a noise contained in the signal amplified by the preamplifier is not flat and the noise increases as the frequency becomes higher. This is commonly referred to as a triangular noise. The frequency spectrum of this noise is shown in FIG. 1, in which the maximum frequency of a video signal band is indicated by fm. Accordingly, the amount of noise contained in the output signal is equal to that obtained by integrating the curve of FIG. 1 from 0 to fm. The frequency spectrum of the video signal changes every moment and does not always spread up to fm.

Figure 2:
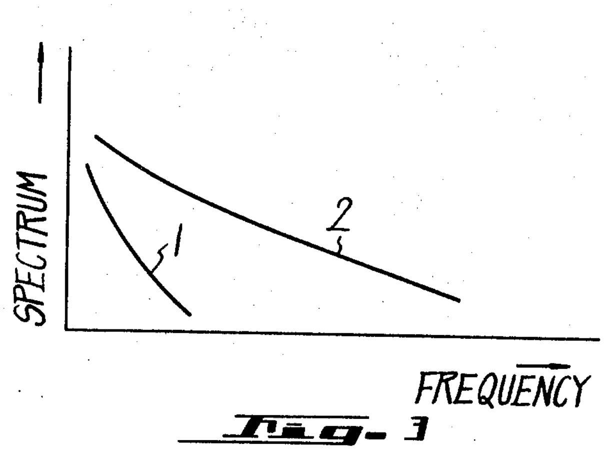
FIG. 2 is a graph showing the distribution of a spectrum of a camera output waveform.

FIG. 2 shows frequency spectrums of the video signals, in which curves 1 and 2 shows the cases where the frequency spectrum of the video signal derived from the camera tube is narrow and wide respectively.

Accordingly, the frequency bandwidth of the signal transmission system need not always be so wide as to extend up to fm. The lower frequency component is rather more than the higher frequency one. From the view point of noise, in the event that the transmission system always covers the frequency range up to fm, when the frequency spectrum of the video signal is narrow the video signal is affected by a high-frequency noise. Further, the high-frequency noise is much greater than the low-frequency one as shown in FIG. 1, so that the picture quality is remarkedly deteriorated. When the frequency spectrum of the video signal is narrow, the reproduced picture is relatively clear and and a noise is conspicuous, while when the frequency spectrum is wide, the reproduced picture is relatively complicated and the noise is not so prominent.

Figure 3:
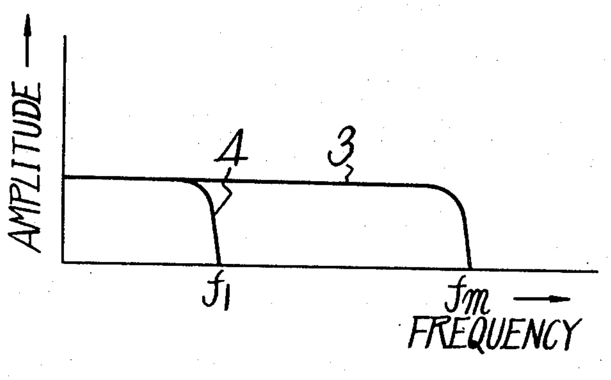
FIG. 3 is a graph showing the frequency band of a transmission system.

The present invention has for its object to remove the deterioration of the S/N ratio which is caused by constant coverage of the conventional television transmission system over too wide a frequency range up to fm. That is, the invention is to provide an apparatus for selecting or automatically changing the bandwidth of the transmission system. The apparatus of this invention consists of a system 3 covering a frequency range up to the maximum frequency fm and a system 4 covering a frequency range only to a frequency $f_1$ far lower than $f_m$ as shown in FIGS. 3 and 5.

Figures 4, 5:
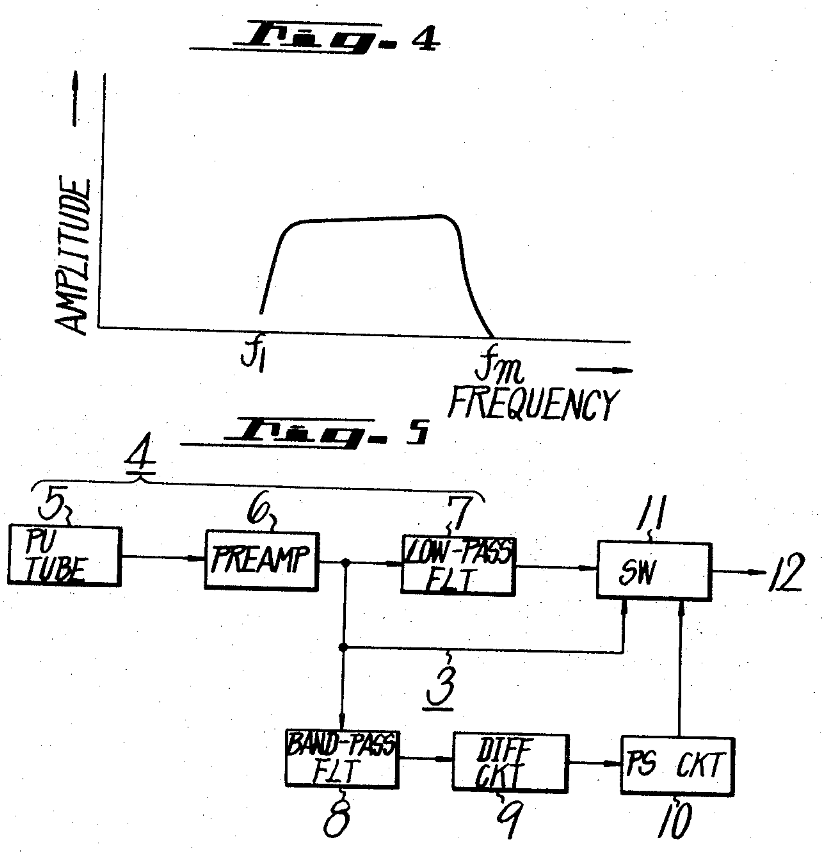
FIG. 4 is a graph showing the band of a spectrum bandpass filter.
FIG. 5 is a block diagram for explaining one example of this invention.

Referring now to FIG. 5, this invention will be described. The output of a camera tube 5 is connected to a preamplifier 6, which covers the frequency range up to the maximum frequency $f_m$ of the video signal. The output of the preamplifier 6 is connected to a low-pass filter 7 having a cutoff frequency $f_1$ to provide the aforementioned system 4. Normally, the video signal passes through the system 4. The output signal of the preamplifier 6 is applied to a band-pass filter 8 of such a frequency characteristic as depicted in FIG. 4 to detect the spectrum component of the video signal from the preamplifier 6 which cannot be covered by the system 4. When an output is derived from the band-pass filter 8, that is, when the frequency spectrum of the video signal contains a component higher than $f_1$, the output signal of the band-pass filter 8 is supplied through a differentiation circuit 9 to a pulse shaping circuit 10 to be differentiated and shaped to provide a pulse. The pulse thus obtained is applied to a video switcher 11 to actuate it. The video switcher 11 is supplied with the output of the system 4 which has passed through the low-pass filter 7 of the cutoff frequency $f_1$ and the output of the system 3 which directly connects the preamplifier to the video switcher 11. Normally, the signal of the system 4 is obtained as an output 12 from the video switcher 11 but when the pulse is fed to the video switcher 11 from the pulse shaping circuit 10, the signal of the system 3 is derived from the video switcher 11 for a period of time corresponding to the pulse width. The switch 11 may be a conventional electronic switch which is actuated by an electrical output from the pulse shaping circuit 10 to connect the output 12 directly to the output of the preamplifier 6. In the absence of electrical signal at the output of the pulse shaping circuit 10 the switch 11 remains in a condition such that it passes the output of the low pass filter 7 to the output terminal 12.

Figure 6:
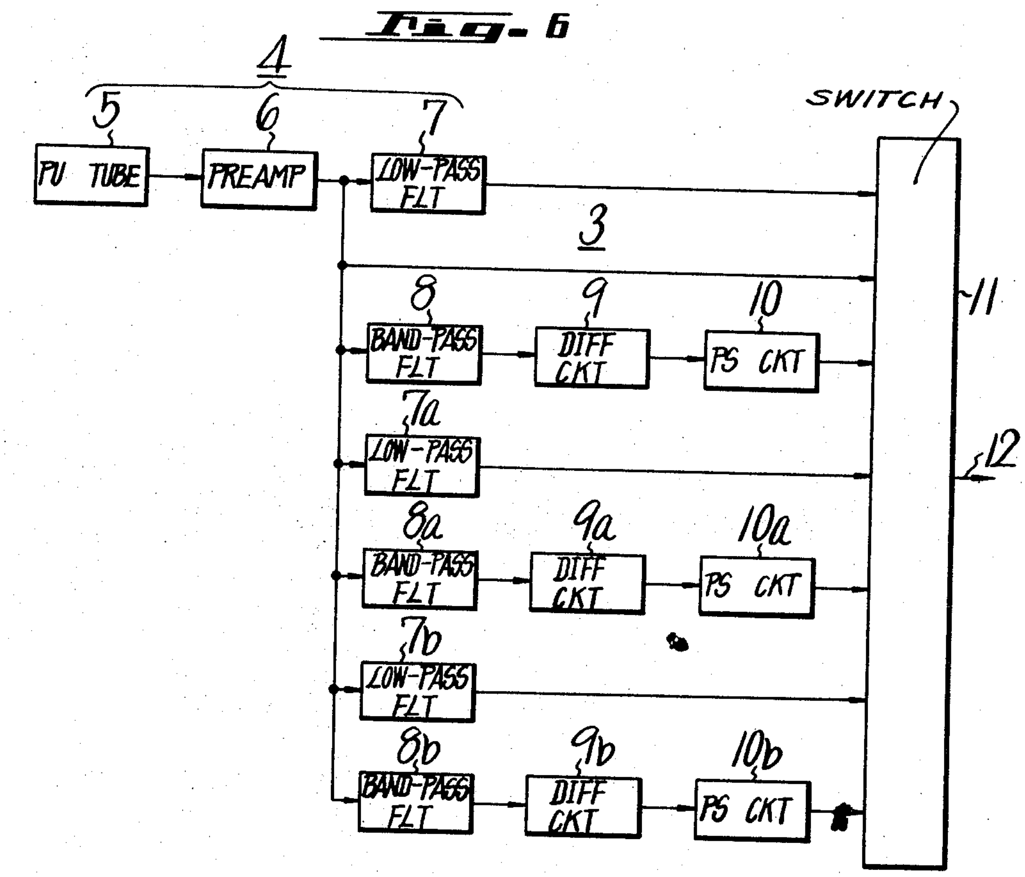
FIG. 6 is a block diagram illustrating another example of this invention.
Figure 7:
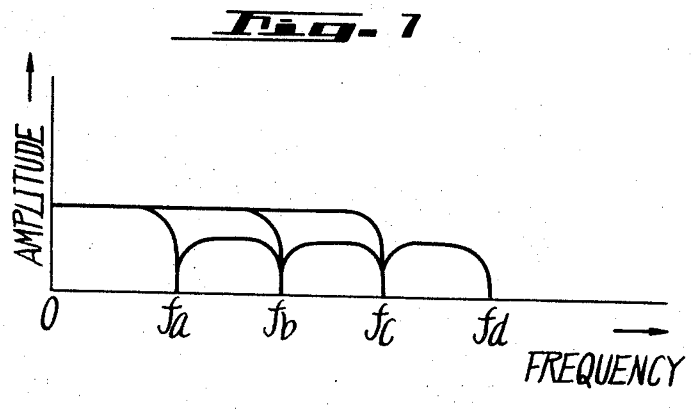
FIG. 7 is a graph showing the band of a band-pass filter.

Turning now to FIGS. 6 and 7, another example of this invention will be described. Although the example of FIG. 5 employs the low-pass filter 7 and the band-pass filter 8 whose pass bands are from 0 to $f_1$ and from $f_1$ to $f_m$ respectively, the example of FIG. 6 employs a plurality of band-pass filters and low-pass filters of different pass bands. In FIG. 6 elements similar to those in FIG. 5 are marked with the same reference numerals and will not be described. As illustrated in FIG. 7, first low-pass filter 7 and band-pass filter 8 have pass bands from 0 to $f_a$ and from $f_a$ to $f_b$ respectively and second and third low-pass filters **7*a* and 7*b* and band-pass filters 8*a* and 8*b* have pass bands from 0 to $f_b$, from 0 to $f_c$, from $f_b$ to $f_c$ and from $f_c$ to $f_d$ respectively. These filters are connected to the video switcher 11 in parallel to one another, by which a plurality of pass bands can be selectively changed over. The system 3 is connected to the video switcher 11 in common to the three pass band frequencies. In FIG. 6 the band-pass filters 8*a* and 8*b* corresponds to 8 in FIG. 5. Reference numerals 9*a*, 9*b* and 10*a*, 10*b* indicate differentiation circuits and pulse shaping circuits corresponding to those 9 and 10 in FIG. 5** respectively.

Figure 8:
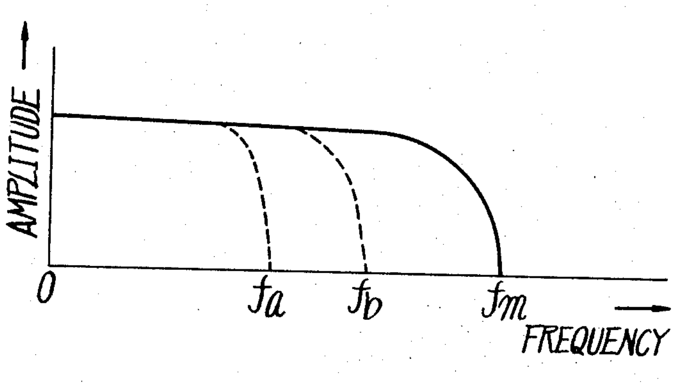
FIG. 8 is a graph illustrating a variable frequency band of a signal transmission system according to this invention.
Figure 9A:
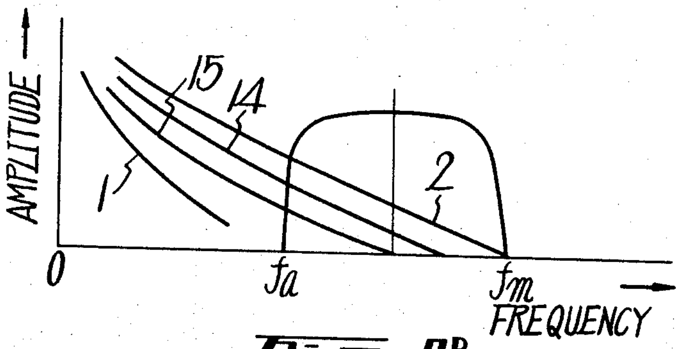
FIG. 9A is a graph for explaining the relation between the band and spectrum of a spectrum detecting filter.
Figure 10:
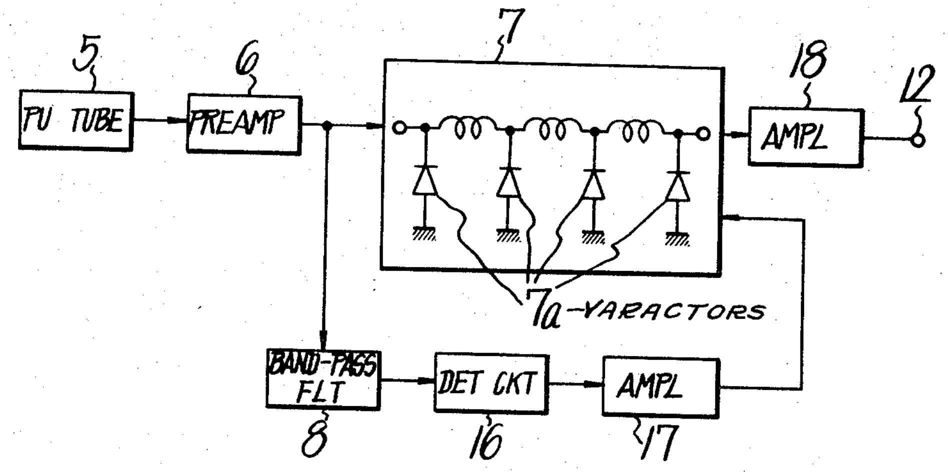
FIG. 10 is a block diagram illustrating still another example of the present invention.

The following will describe another example of this invention for automatically changing the pass band of the signal transmission system in accordance with the spectra. The apparatus of this example consists of a low-pass filter capable of automatically changing the pass band in the frequency range from the lower frequency $f_a$ to the maximum frequency $f_m$ as depicted in FIG. 8 and a band-pass filter having the pass band from $f_a$ to $f_m$ as shown in FIG. 9A. With reference to FIG. 10 the present example will hereinbelow be described. The camera tube 5 and the preamplifier 6 are identical with those in the example of FIG. 5. The preamplifier has a cutoff frequency $f_m$ and the low-pass filter 7 is adapted to change its pass band in the range from the frequency $f_a$ to $f_m$ as shown in FIG. 8. Under normal conditions, the low-pass filter 7 permits the passage therethrough of signals up to the frequency $f_a$.

Figure 9B:
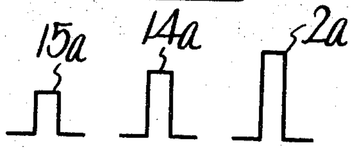
FIG. 9B is a detecting pulse waveform.

The output of the preamplifier 6 is fed to the band-pass filter 8 having a pass band ranging from $f_a$ to $f_m$ as depicted in FIG. 9A to detect the frequency spectrum of the video output from the preamplifier between the frequencies $f_a$ and $f_m$. The band-pass filter 8 is provided with a spectrum detecting means which is designed as will be described just hereinbelow. The band-pass filter 8 has a pass-band so as to pass the pulses **15*a*, 14*a*, and 2*a* illustrated in 9B which fall in the band between $f_a$ and $f_m$ illustrated in FIG. 9. In other words, the filter passes three separate and distinct frequency ranges as illustrated in FIG. 9B. Such filters are well known. That is, pulses 15*a*, 14*a* and 2*a* are detected which are of different levels depending upon spectrums 15, 14 and 2 in the band from $f_a$ to $f_m$ as depicted in FIG. 9B, the detected pulses are applied to a detector circuit 16 to obtain an average DC voltage corresponding to the spectrum levels and the DC voltage is suitably amplified by an amplifier 17 and then applied to a variable capacitance diode 7*a* in the low-pass filter 7 to alter the bias of the variable capacitance diode 7*a*. The signal thus obtained is amplified by an amplifier 18 to provide an output signal at the output terminal 12**. In this manner, the pass band can be automatically changed between the frequencies $f_a$ and $f_m$ in response to the frequency spectrum of the signal from the transmission system in the range from $f_a$ to $f_m$.

Accordingly, the use of this invention decreases entropy of the signal to provide for greatly improved S/N ratio.

Although this invention has been described as being applied to the television camera, it will be seen that the invention is similarly applicable to a television receiver to obtain the same results.

It will be apparent that many modifications and variations may be effected without departing from the scope of the novel concepts of this invention.

I claim as my invention

1. A variable bandwidth circuit operable at television modulation frequencies comprising, a television camera tube producing a signal, a preamplifier receiving the output signal of said camera tube, a first low pass filter receiving the output of said preamplifier and passing low frequency components of television modulation frequencies, a first band-pass filter receiving the output of said preamplifier and passing frequency components of said television modulation frequencies higher than those passed by said low pass filter, a switch with a pair of input terminals respectively connected to the outputs of said low pass filter and said preamplifier and having an output terminal, and switch actuating means connected to the output of said band pass filter and connected to said switch to connect the output terminal to said preamplifier when signals above a predetermined level pass said band pass filter.

2. A variable bandwidth circuit according to claim 1 wherein said switch actuating means comprises a differentiating circuit receiving the output of said band pass filter and a pulse shaper circuit connected between said differentiating circuit and said switch.

3. A variable bandwidth circuit according to claim 2 including a second low pass filter with a pass band different from said first low pass filter connected between said preamplifier and said switch, a second band pass filter with a different pass band than said first band pass filter receiving an input from said preamplifier, and said switch actuating means further includes a second differentiating circuit receiving the output of said second band pass filter and a second pulse shaper circuit connected between said second differentiating circuit and said switch.

4. A variable bandwidth circuit operable at television modulation frequencies comprising, a television camera tube, a preamplifier receiving the output signal of said camera tube, a low pass filter receiving the output of said preamplifier and comprising a plurality of inductors connected in series between input and output terminals and a plurality of voltage variable capacitors connected in shunt between the series connected inductors and ground, a band pass filter connected to said preamplifier, a detector circuit connected to said voltage variable capacitors to vary the pass band of said low pass filter and receiving an input from said band pass filter.

* * * * *